United States Patent

[11] 3,621,469

[72] Inventor Douglas M. Bauer
Danvers, Mass.
[21] Appl. No. 852,042
[22] Filed Aug. 21, 1969
[45] Patented Nov. 16, 1971
[73] Assignee General Electric Company

[54] VOLTAGE CONTROLLED OSCILLATOR
10 Claims, 3 Drawing Figs.

[52] U.S. Cl. .......... 331/111, 331/143
[51] Int. Cl. .......... H03k 3/26
[50] Field of Search .......... 331/111, 143; 307/261, 228

[56] References Cited
UNITED STATES PATENTS
3,156,875 11/1964 Fiorino et al. .......... 307/261
3,432,772 3/1969 Johnsen et al. .......... 331/111

*Primary Examiner*—John Kominski
*Attorneys*—I. David Blumenfeld, Frank L. Neuhauser, Oscar B. Waddell and Joseph B. Forman

ABSTRACT: A voltage controlled oscillator is provided in which a minimal number of switching elements are employed to produce output pulses. A current source circuit determines the charging rate of a capacitor in response to an input voltage. As the capacitor charges, the potential level at one terminal thereof, which is coupled to a comparator circuit, decreases. When this potential reaches a predetermined level, the output of the comparator circuit changes state to control a switching device which produces an output pulse. In one form of the invention, the predetermined level is determined by the input voltage. Means are coupled to the output of the comparator circuit to discharge the capacitor when the output pulse is produced.

Inventor
Douglas M. Bauer
by David Blumenfeld
His Attorney

VOLTAGE CONTROLLED OSCILLATOR

BACKGROUND OF THE INVENTION

This invention relates to voltage controlled oscillators which produce an output frequency that is a function of the input voltage applied thereto.

A voltage controlled oscillator is susceptible of many applications. One use is the conversion of a data-indicating analog voltage to a pulse train for utilization by an output frequency utilization device. The data-indicating signal may be, for example, the output of a strain gauge, and the output frequency utilization device may be a counter.

A typical voltage controlled oscillator includes a capacitor which is charged by a source of potential. When the charge on the capacitor reaches a predetermined level, a switching device is actuated so that an output pulse is produced. After initiation of the output pulse, the capacitor is discharged. It is desirable that the voltage controlled oscillator produce a wide range of output frequencies for a given range of input voltages. This provides for greatest resolution of the input voltage so that a precise output is supplied to the output frequency utilization device. Prior converters have been complex in construction. Since they include several switching elements for producing an output pulse, their response time to the capacitor's charging is increased and their output frequency range is decreased. In the present invention, a minimal number of switching elements are utilized to produce output pulses. Furthermore, one level of charge on the capacitor must be chosen as the point at which the switching operation which produces the output pulse is initiated. The range of input voltages to which the voltage controlled oscillator will respond is thus limited. In one form of the present invention, the level of charge on the capacitor at which the switching operation is initiated is made to vary with the input voltage.

SUMMARY OF THE INVENTION

It is therefore an object of the present invention to provide a voltage controlled oscillator having an extended range of output frequencies for a given range of input voltages.

It is a more specific object of the present invention to provide a voltage controlled oscillator which produces with a high degree of resolution an output frequency indicative of the voltage applied thereto.

It is also an object of the present invention to provide a voltage controlled oscillator in which the switching point of the output pulse-producing circuitry is controlled by the magnitude of the input voltage to extend the range of input voltages to which the voltage controlled oscillator will respond.

It is another object of the present invention to provide a voltage controlled oscillator which is capable of being automatically disabled when the input voltage thereto falls below a level to which the voltage controlled oscillator responds.

It is a further object of the present invention to provide a voltage controlled oscillator which is extremely simple in construction.

Briefly stated, in accordance with the present invention there is provided a voltage controlled oscillator which produces an output frequency indicative of the input voltage applied thereto. A timing capacitor is connected to a source of potential, and its rate of charging is determined by a current source circuit responsive to the input voltage. A comparator circuit, which may comprise an operational amplifier, has a first input terminal connected to be responsive to the potential level at one terminal of the capacitor and a second input terminal connected to a source of reference potential. When the potential level at the one terminal of the capacitor reaches a predetermined level with respect to the reference voltage, the output of the comparator changes state to initiate an output pulse. The change of state of the comparator also initiates discharging of the capacitor so that the converter may begin its next cycle of operation.

BRIEF DESCRIPTION OF THE DRAWINGS

The novel features of the present invention are particularly pointed out in the claims which form the concluding portion of the specification. The invention both as to its organization and manner of operation, as well as the objects attained with its use, may be further understood by reference to the following drawings taken in connection with the following description.

Of the drawings

DETAILED DESCRIPTION OF THE PREFERRED EMBODIMENTS

Figure 1:
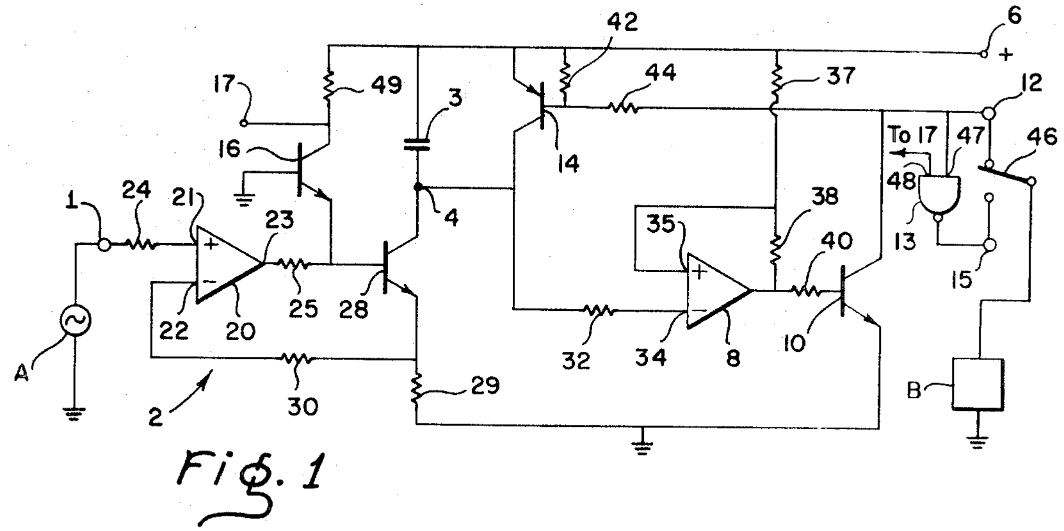
FIG. 1 is a schematic representation of a voltage controlled oscillator constructed in accordance with the present invention.

FIG. 1 is illustrative of a voltage controlled oscillator constructed in accordance with the present invention which provides an output frequency indicative of the instantaneous level of a positive input voltage applied thereto. An input voltage provided by a source A is connected to the input terminal 1 to control the magnitude of current supplied by a current source circuit 2 which is coupled to one terminal of a timing capacitor 3 by a terminal 4. The other terminal of the capacitor 3 is coupled to a source of positive potential 6. As the capacitor 3 charges, the potential level at the terminal 4 decreases. A voltage indicative of the potential level at the terminal 4 is coupled to a comparator circuit 8 to be compared to a reference voltage. When the voltage coupled to the comparator 8 from the terminal 4 reaches a predetermined level, the output of the comparator 8 changes from a low state to a high state. This output is coupled to a bistable switching element comprising a transistor 10, and, when in the high state, turns it on.

The emitter-collector circuit of the transistor 10 is coupled between the source of potential 6 and a lower level of potential, which in this embodiment comprises ground potential. The state of the transistor 10, which is coupled to the source of potential 6, controls the level of potential of an output terminal 12 which is also coupled to the source of potential 6. When the transistor 10 is turned on, the potential at the output terminal 12 is brought to ground potential. This change of the level of potential at the output terminal 12 comprises an output pulse. The output frequency utilization device B may be coupled directly to the output terminal 12 to be responsive to the output of the voltage controlled oscillator at all times. If it is desired that the voltage controlled oscillator provide an output only when the input voltage thereto is positive, the output frequency utilization device B may be coupled to a gated output terminal 15 of a NAND-gate 13. The NAND-gate 13 has one input terminal coupled to the output terminal 12 and is gated in a manner described below.

In addition, the collector of the transistor 10 is coupled to the base of a transistor 14 having its emitter-collector circuit connected across the capacitor 3. Consequently, at the same time an output pulse is produced, the transistor 14 is turned on to discharge the capacitor 3 so that the output of the comparator 8 returns to its low state to turn off the transistor 10 and terminate the output pulse.

The NAND-gate 13 is gated by a transistor 16 which is connected between the current source circuit 2 and the source of potential 6. The transistor 16 operates as a bistable switching element to produce an output at a terminal 17 which is coupled to an input terminal of the NAND-gate 13.

Referring now in greater detail to FIG. 1, the current source circuit 2 comprises an operational amplifier 20 having a noninverting input terminal 21, an inverting input terminal 22 and an output terminal 23. The terminal 21 is coupled to the input terminal 1 by a resistor 24 and the output terminal 23 is coupled by a resistor 25 to the base of an NPN-transistor 28, also included in the current source circuit 2. A current sensing resistor 29 is connected between the emitter of the transistor 28 and ground potential, and a feedback resistor 30 is connected between the emitter of the transistor 28 and the inverting input terminal 22 of the operational amplifier 20. The operational amplifier 20 is connected as a voltage follower to maintain the voltage drop across the resistor 29 substantially equal to the input voltage at the input terminal 21. The resistor 29 also serves as a current-sensing resistor.

The resistor 30 is chosen to have a value such that the current flowing therethrough may be neglected, and it may then be said that the current through the resistor 29 is equal to the sum of the base and collector currents of the transistor 28. For optimum operation, the collector current of the transistor 28 is maximized by choosing a transistor 28 having a high beta, or current gain, for example, a beta of 100. The collector of the transistor 28 is connected to the terminal 4 and to the lower end of the capacitor 3, the upper end of which is connected to the positive source of potential 6. The capacitor 3 is charged by the collector current of the transistor 28. The collector current is related to the current through the resistor 29 which is responsive to the input voltage. The charging current coupled to the capacitor 3 from the terminal 4 is equal to the algebraic sum of the current through the resistor 29 and the currents flowing through other paths. These currents through other paths include the base current of the transistor 28, the current through the resistor 30 and current flowing from the terminal 4 to the operational amplifier 8 and the transistor 14. These currents, however, are small in relation to the charging current. Therefore, the charging rate of the capacitor 3 corresponds to and is substantially proportional to the input voltage.

At the commencement of an operating cycle, the capacitor 3 is discharged and the potential level at the terminal 4 is equal to the potential of the source 6. The terminal 4 is coupled by a resistor 32 to an inverting input 34 of the operational amplifier 8 so that a voltage $V_{C3}$ (shown in FIG. 2*a*) indicative of the charge on the capacitor 3 is applied thereto. The potential level at the terminal 4 is equal to that potential of the source 6 minus a time integral of the collector current of the transistor 28. As explained above, the collector current of the transistor 28 is substantially proportional to the voltage across the resistor 29. The voltage $V_{C3}$ is compared to a reference voltage $V_{ref}$ (shown in FIG. 2*a*) coupled to a noninverting input 35 of the operational amplifier 8. The level of $V_{ref}$ is chosen to be slightly above the value to which $V_{C3}$ is capable of decreasing so that at one point during each operating cycle the $V_{C3}$ will go below $V_{ref}$ to change the state of the operational amplifier 8. A convenient level of potential at which to set $V_{ref}$ is one slightly above the maximum voltage of the input voltage range that will appear across the resistor 29.

When the operational amplifier 8 changes state, the potential at its output terminal 36 changes from a low state, e.g., 0 volts, to a high state, i.e., a potential capable of turning on the transistor 10. The voltage $V_{ref}$ is provided from a voltage divider comprising a pair of resistors 37 and 38 connected in series between the source 6 and the output terminal 36 of the operational amplifier 8. The junction between the resistors 37 and 38 is connected to the noninverting input terminal 35. When the output of the operational amplifier 8 is in the high state, the resistor 38 couples positive feedback to the input terminal 35 to provide a predetermined amount of hysteresis between the switching points of the operational amplifier 8.

The output terminal 36 of the operational amplifier 8 is coupled by a resistor 40 to the base of the transistor 10 which has its emitter coupled to ground potential and its collector coupled to the output terminal 12. The output terminal 12 is coupled to the source 6 by series-connected resistors 42 and 44 so that when the transistor 10 is biased off, the level of potential at the output terminal 12, $V_{out}$, (shown in FIG. 2*c*) is at a first level, which is near that of the source 6. When the transistor 10 is turned on in response to a change of state of the operational amplifier 8, the output terminal 12 is coupled to ground potential. $V_{out}$ then assumes its second state, and an output pulse is initiated.

The collector of the transistor 10 is also coupled by the resistor 44 to the base of the PNP-transistor 14, the emitter-collector circuit of which is connected across the capacitor 3. Thus when the transistor 10 is turned on and the potential at its collector drops to substantially ground potential, the transistor 14 turns on to discharge the capacitor 3. As the capacitor 3 discharges, the voltage $V_{C3}$ increases to return the operational amplifier 8 to its original state. Consequently, the transistors 10 and 14 turn off, the potential level $V_{out}$ at the output terminal 12 returns to its first level and the output pulse is terminated. Propagation delays in the circuit assure an adequate period of conduction for the transistor 14 to discharge the capacitor 3. The change of potential at the output terminal 12 from its first level to its second level comprises the initiation of the first portion of an output pulse cycle, and the return of that potential to its first level comprises the initiation of the second portion of an output pulse cycle. The pulse rate at the output terminal 12 comprises the output frequency of the voltage controlled oscillator.

The voltage controlled oscillator in FIG. 1 produces an output frequency accurately indicative of instantaneous positive voltage levels applied to the input terminal 1. However, due to leakage current in the capacitor 3, the circuit is capable of producing a low frequency output even when the input voltage goes to a negative level which tends to bias the transistor 28 off. In particularized applications in which it is undesirable to have this low frequency output, a single-pole, double-throw switch 46 is utilized to decouple the output frequency utilization device B from the output terminal 12 and couple it to the gated output terminal 15 of the NAND gate 13. The NAND-gate 13 has a first input terminal 47 coupled to the output terminal 12 and a second input terminal 48 coupled to the terminal 17. The terminal 17 is coupled to the collector of the transistor 16 which has its base connected to ground potential, its emitter connected to the terminal of the resistor 25 remote from the operational amplifier 20, and its collector coupled through a resistor 49 to the source 6.

When the input voltage to the terminal 1 goes to a negative level, a negative voltage appears at the terminal 23. The resulting negative current through the resistor 25 tends to turn on the NPN-transistor 16 and bias the transistor 28 off. Therefore, the potential at the terminal 17 goes from a potential equal to that of the source 6, which corresponds to a logic level of "1", to substantially ground potential, which corresponds to a "0" logic level. Thus, with respect to the NAND-gate 13, the input at its terminal 48 goes to a logic level of "0". Since a NAND gate produces an output having a potential corresponding to a logic level of "1" when either input thereto comprises a "0" only a "1" level may appear at the gated output terminal 15 irrespective of the input from the output terminal 12 to the input terminal 47. Since this "1" level corresponds to the above-described first level of potential at the output terminal 12, no output pulses are produced, and the voltage controlled oscillator is disabled.

When the input voltage returns to a positive level, the transistor 16 is biased off and the input to the terminal 48 of the NAND-gate 13 returns to a potential corresponding to a "1" level. Therefore, normal operation is resumed. The NAND-gate 13, however, provides an output at the gated output terminal 15 which is inverted with respect to that at the output terminal 12. More specifically, each time the level of potential at the output terminal 12 goes from its first level to the second level, which corresponds to a "0" logic level, the input terminal 47 supplies a "0" to the NAND-gate 13. Therefore, a "1," corresponding to the first level of potential, appears at the output terminal 15. The presence of a "1" at the gated output terminal 15 at this time comprises the first portion of the inverted output pulse cycle. When the level of potential at the output terminal 12 returns to its first level, a "1" is supplied to the NAND-gate 13 at the input terminal 47, and a "0" appears at the gated output terminal 15. This "0"

corresponds to the second level of potential and comprises the second portion of the inverted output pulse cycle. The pulse repetition rate at the gated output terminal 15 is the same as that at the output terminal 12.

It should be noted that the output appearing at the terminal 17 could also be used to control any other convenient means for disabling the voltage controlled oscillator.

OPERATION

The source of input voltage A may comprise an alternating current voltage or a variable or fixed level of DC voltage. The voltage controlled oscillator of FIG. 1 will produce an output frequency indicative of the instantaneous value of a positive voltage applied to the input terminal 1, and will produce no output signal when the voltage at the input terminal 1 goes to a negative level.

Figure 2:
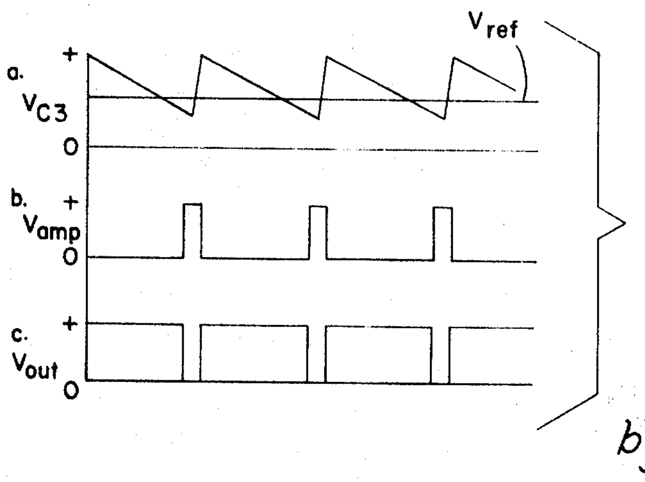
FIG. 2 is a diagram illustrative of the operation of the circuit of FIG. 1.

Reference should now be had to FIG. 2 which is representative of three operating cycles of the voltage controlled oscillator. FIG. 2*a* is representative of $V_{C3}$; FIG. 2*b* is representative of the state of the output terminal 36 of the operational amplifier 8, $V_{amp}$; and FIG. 2*c* is representative of $V_{out}$ at the output terminal 12. The waveform appearing at the gated output terminal 15 is not shown in FIG. 2 since it simply comprises an inverted image of FIG. 2*c*. For purposes of illustration, it may be assumed that the source A provides an instantaneous potential of +3 volts to the input terminal 1 and the output terminal 12 supplies a voltage $V_{out}$ having a frequency of 5000 Hz. to the output frequency utilization device B.

In FIG. 2*a*, the upward going ramp voltage represents the discharge of the capacitor 3. For purposes of analysis, let it be assumed that the capacitor 3 has just been discharged and the transistor 14 has just turned off. The voltage $V_{C3}$ is then at the peak of the ramp waveform shown in FIG. 2*a*. As explained above, the capacitor 3 charges at a rate proportional to the input voltage applied to the terminal 1. Since the capacitor 3 is charged by the current source 2, the voltage $V_{C3}$ decreases linearly, and the slope of the waveform representing $V_{C3}$ is proportional to the input voltage. When $V_{C3}$ decreases below $V_{ref}$, the operational amplifier 8 changes state, and its output goes from a low state to a high state (FIG. 2*b*). Consequently, the transistor 10 turns on, bringing $V_{out}$ to ground potential.

With ground potential applied to the base of the transistor 14, it turns on to discharge the capacitor 3. As the capacitor 3 discharges, $V_{C3}$ rapidly increases (FIG. 2*a*) and when the voltage at the terminal 34 of the operational amplifier 8 exceeds that at the terminal 35, the output of the operational amplifier 8 returns to its low state to bias the transistor 10 off and terminate the output pulse. Consequently, the level of potential at the base of the transistor 14 returns to a positive level, turning the transistor off so that another operating cycle of the voltage controlled oscillator may commence. Sufficient time for the discharge of the capacitor 3 between the turning on of the transistor 14 and its biasing off is provided by propagation delays within the circuit. Further time for the discharge of the capacitor 3 is provided as a result of the positive feedback arrangement including the resistor 38 since $V_{C3}$ must rise to a value somewhat higher than $V_{ref}$ to switch the operational amplifier back to its original state.

In FIG. 2, the changes of state of the operational amplifier 8 and of $V_{out}$ in response to the change of state of the transistor 10 are shown as occurring sometime after $V_{C3}$ decreases below and returns to a level above $V_{ref}$. This is done in order to illustrate the propagation delays within the circuit. However, since the three waveforms shown in FIG. 2 may occur within a time span of 1 millisecond, and the propagation delays are on the order of microseconds, it should be noted that FIG. 3 is an illustration of the operation of the circuit rather than a precise timing diagram.

Figure 3:
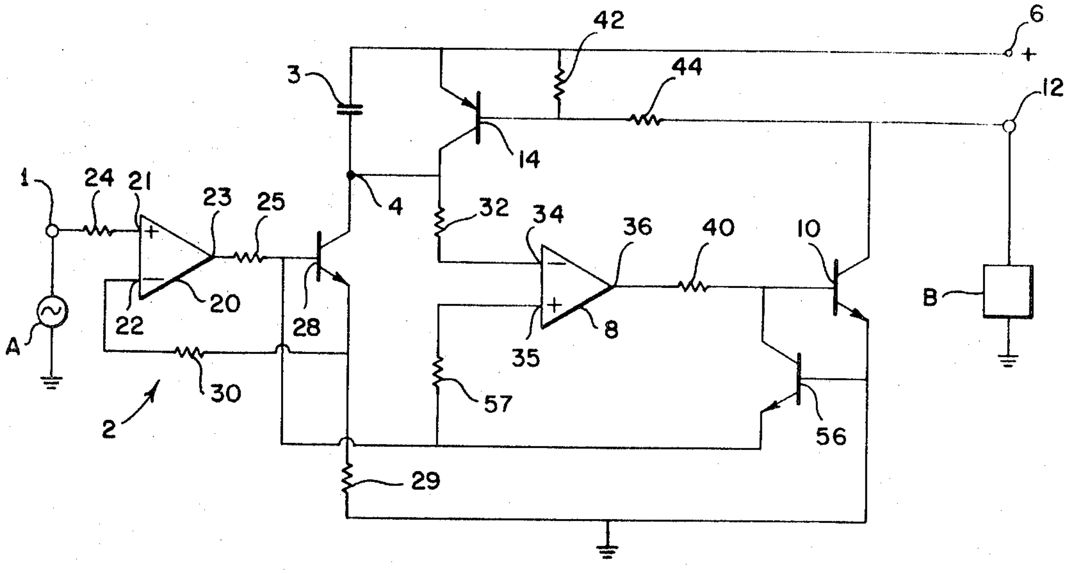
FIG. 3 is a schematic diagram of another form of the invention.

FIG. 3 represents another form of the present invention in which greater versatility is achieved by comparing $V_{C3}$, which is also the collector voltage of the transistor 28, to the base voltage of the transistor 28 rather than to a fixed reference voltage. In the embodiment of FIG. 1, a $V_{ref}$ is selected which is a convenient voltage level away from the maximum voltage which will appear across the resistor 29, for example 0.5 volts. In the embodiment of FIG. 3, this reference voltage value is always provided by utilizing the base voltage of the transistor 28 as the source of $V_{ref}$. In addition, a bistable switching element comprising a transistor 56 is provided in place of the transistor 16 to disable the voltage controlled oscillator when the voltage at the input terminal 1 goes to a negative level. In this figure, the same reference numerals are used to indicate circuit components which correspond to those in FIG. 1 and which operate in the same manner. Therefore, FIG. 3 will be analyzed with respect to the means by which the operational amplifier 8 is switched and the manner in which the transistor 56 is utilized.

Referring now to the specific circuitry by which the above-described operation is achieved, $V_{ref}$ is provided to the input terminal 35 of the operational amplifier 8 by coupling a resistor 57 between the base of the transistor 28 and the input terminal 35. The input terminal 34 of the operational amplifier 8 is coupled to the terminal 4 by the resistor 32. Since $V_{C3}$ is also indicative of the collector voltage of the transistor 28 and is compared to a $V_{ref}$ indicative of its base voltage, in effect, the saturation of the transistor 28 is sensed. As the capacitor 3 charges, $V_{C3}$ decreases. Since the base voltage of the transistor 28 is always equal to its base-emitter voltage drop plus the input voltage, the value of $V_{ref}$ applied to the input terminal 35 is always above the maximum voltage drop across the resistor 29. Therefore, as explained with respect to FIG. 1, $V_{ref}$ is always at a level below which $V_{C3}$ is capable of decreasing during each operating cycle. Since $V_{ref}$ is determined by the input voltage, rather than being fixed, it is always at a desired level such that the operational amplifier 8 will respond to $V_{C3}$ to initiate an output pulse.

In order to disable the voltage controlled oscillator when the input voltage to the terminal 1 goes to a negative level, the NPN-transistor 56 is provided having its base connected to ground potential, its collector connected to the base of the transistor 10, and its emitter connected to the terminal of the resistor 25 remote from the operational amplifier 20. When the input voltage goes to a negative level, the transistor 56 turns on to hold the base of the transistor 10 at a low level to prevent its switching. Therefore, no output pulses can be produced.

The present invention thus provides a voltage controlled oscillator which is extremely simple in construction. Due to the small number of elements used, response time of the voltage controlled oscillator to an input voltage is reduced giving it a much greater frequency range than prior voltage controlled oscillators. By way of exemplification, a voltage controlled oscillator in accordance with FIG. 3 has been constructed which, for an input voltage of 0–3 volts, produces an output frequency of 20–5,000 Hz. utilizing the following components:

Resistor 24....10 kohms
Resistor 25....5 kohms
Resistor 29....500 ohms
Resistor 30....10 kohms
Resistor 32....10 kohms
Resistor 40....1 kohms
Resistor 42....1 kohms
Resistor 44....500 ohms
Resistor 57....10 kohms
Capacitor 3....0.1 $\mu$ff
Operational Amplifier 8....A702A
Operational Amplifier 20....$\mu$A741
Transistor 28....2N3417
Transistor 10....2N3417
Transistor 56....2N3417
Transistor 14....2N5367
Source 6....+5 volts DC Many modifications may be made in the circuitry of FIGS. 1 and 3 to build a voltage controlled oscillator constructed in accordance with the present invention. For example, rather than having its collector directly connected to the capacitor 3, the transistor 28 could be connected to a field effect transistor connected between the capacitor 3 and the resistor 29. Many other modifications are possible.

What is claimed as new and desired to be secured by Letters patent of the United States is:

1. A voltage controlled oscillator for connection between a source of input voltage and an output frequency utilization means for producing a train of output pulses the repetition rate of which is proportional to the input voltage comprising in combination:

a. a capacitor for connection to a source of varying direct-current potential;

b. a current source circuit for charging said capacitor having an input (terminal) coupled to the source of input voltage and being coupled to said capacitor for controlling the magnitude of capacitor charging current in response to the magnitude of the input voltage comprising an operational amplifier connected as a voltage follower and having first and second input terminals and an output terminal, a transistor having its base coupled to the output terminal of said operational amplifier and having its emitter-collector circuit connected in series between said capacitor and a level of potential differing from that of the source of direct-current potential, said first input terminal of said operational amplifier being coupled to the source of input voltage and said second input terminal of said operational amplifier being coupled to the emitter of said transistor to provide a feedback loop to the operational amplifier whereby the current flowing through said transistor is directly proportional to the amplitude of the input voltage by virtue of said voltage follower operation;

c. a comparator circuit having a first input terminal connected to be responsive to the voltage across said capacitor, a second terminal connected to a source of reference potential, and an output terminal, the state of potential of the output of said comparator changing from a first level to a second when the potential at its first input reaches a predetermined level with respect to said reference potential;

d. a first bistable switching element having a control terminal coupled to the output of said comparator, said element changing its conductive state in response to a change of state in the output of said comparator; and e. means responsive to the output of said bistable element for discharging said capacitor when the output of said comparator changes from its first state to its second state for returning the output of said comparator circuit to its first state.

2. A voltage controlled oscillator according to claim 1 in which said comparator circuit comprises an operational amplifier having its first input terminal coupled to the terminal of the capacitor at which the potential changes as the capacitor charges, and further comprising means for coupling positive feedback from the output terminal of said operational amplifier to its second input terminal.

3. The voltage controlled oscillator of claim 1 in which said comparator circuit comprises an operational amplifier having its first input terminal coupled to the terminal of the capacitor at which the potential changes as the capacitor charges.

4. The voltage controlled oscillator of claim 4 further comprising means for coupling positive feedback from the output terminal of said comparator operational amplifier to its second input terminal.

5. The voltage controlled oscillator of claim 1 further comprising a second bistable switching element coupled between the output terminal of said operational amplifier and the source of direct current potential for producing an output which may be utilized for disabling said voltage controlled oscillator when the output of said operational amplifier is of a polarity which biases said transistor off.

6. The voltage controlled oscillator of claim 5 further comprising a NAND gate having an output terminal for connection to said output frequency utilization means, a first input terminal coupled to said first bistable switching element and a second input terminal connected to the output of said second bistable switching element, whereby no output pulses are provided for connection to said output frequency utilization means when the output of said operational amplifier is of a polarity which biases said transistor off.

7. The voltage controlled oscillator of claim 1 further comprising a second bistable switching element coupled between the output terminal of said operational amplifier and said first bistable switching element to hold said first bistable switching element off when the output of said operational amplifier is of a polarity which biases said transistor off.

8. A voltage controlled oscillator according to claim 1 in which said comparator circuit comprises an operational amplifier having a first input terminal coupled to the terminal of the capacitor at which the potential changes as the capacitor charges and a second input terminal coupled to the base of said transistor of said current source circuit.

9. A voltage controlled oscillator according to claim 8 further comprising a second bistable switching element coupled between the output terminal of said operational amplifier of said current source circuit and said first bistable switching element to hold said first bistable switching element off when the output of said operational amplifier is of a polarity which biases said transistor of said current source circuit off.

10. A voltage controlled oscillator according to claim 1 wherein said means responsive to the output of said comparator for discharging said capacitor comprises a transistor having its emitter-collector circuit coupled across said capacitor and its base coupled to said first bistable switching element.

* * * * *